June 13, 1939.  E. GENTSCH  2,161,860
MEANS TO SECURE ELECTRIC LINES TO A SUPPORT
Filed Oct. 1, 1935   2 Sheets—Sheet 1
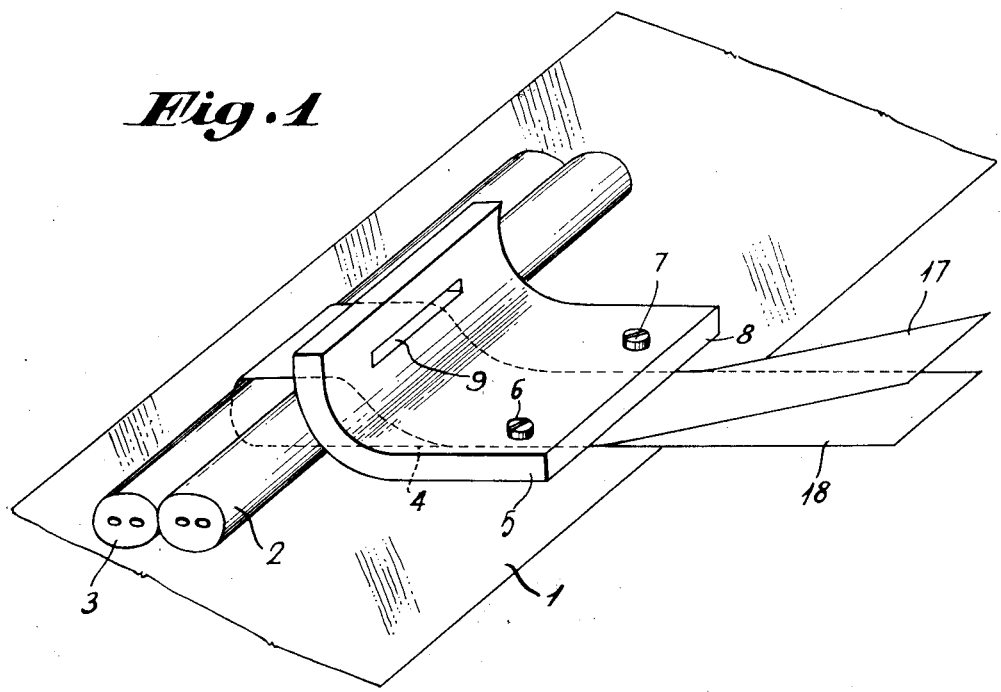
INVENTOR
ERICH GENTSCH
BY
ATTORNEY

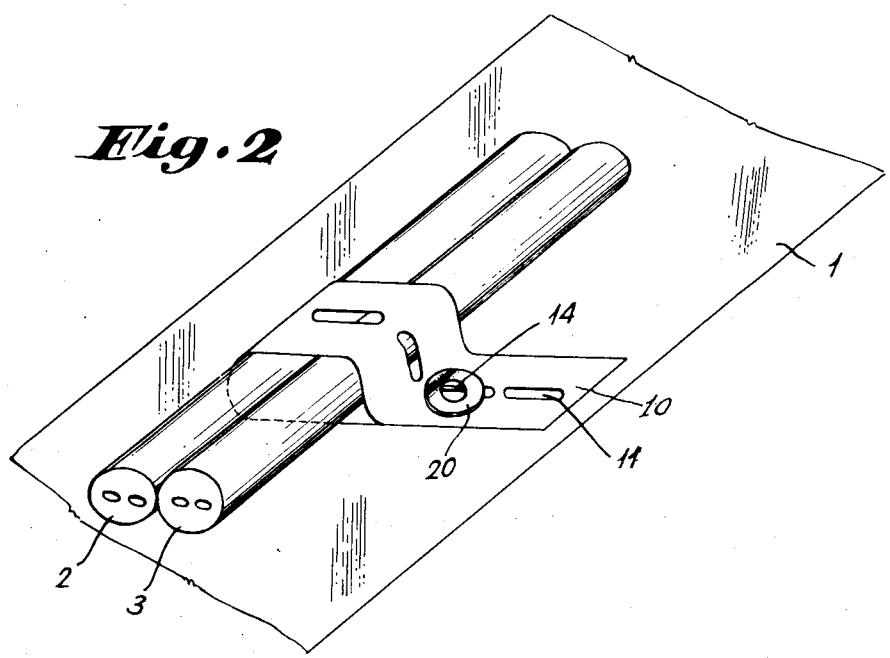
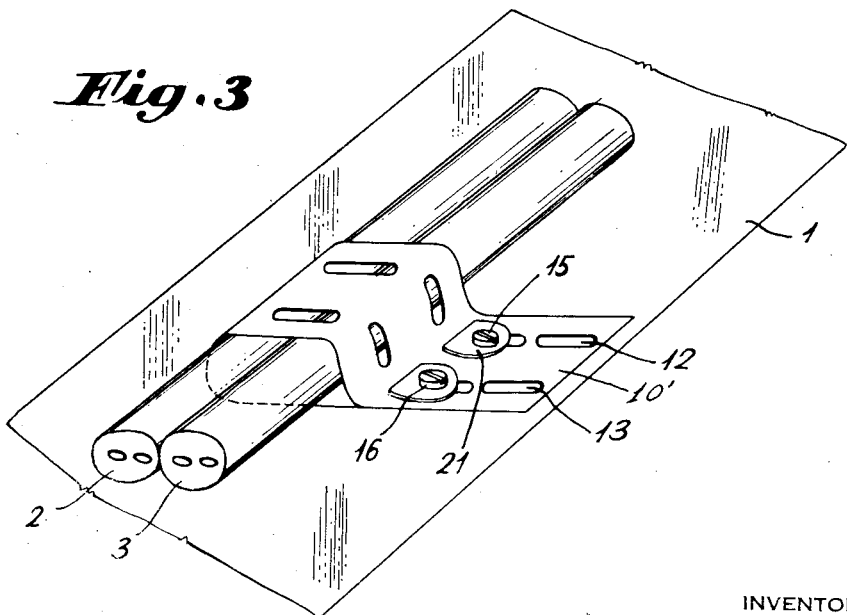

Patented June 13, 1939

2,161,860

UNITED STATES PATENT OFFICE 2,161,860

MEANS TO SECURE ELECTRIC LINES TO A SUPPORT

Erich Gentsch, Berlin, Germany, assignor to Telefunken Gesellschaft für Drahtlose Telegraphie m. b. H., Berlin, Germany, a corporation of Germany Application October 1, 1937, Serial No. 166,808
In Germany July 28, 1936

4 Claims. (Cl. 24—19)

This invention is concerned with means designed to secure and fasten electric lines to a support.

It is known that electric lines or conductors may be secured upon supporting surfaces such as walls, racks, frames, casing walls or shells or the like, by the agency of clips or clamps. If several such wires or conductors are contiguous and adjacent to one another, they are mostly united into a cable or cables. Such cables as used, for instance, in equipment for the signal and communication arts, say, for amplifiers, are made in such a way that the pre-bent or -shaped lines are tied together with a string throughout their entire length upon a special form frame. Branched lines are then tied off separately. Upon the supporting means the lines are secured by specially formed clips or clamps.

Now, these clips or clamps must be manufactured of distinct form and size according to the number of lines or cables which are to be tied or strapped together for the various kinds of equipment. Whenever the number of lines to be combined is comparatively large, the clips as a rule must be made so that they are fashioned to conform to the diameter of the bunch of cables from a strip of sheet metal. This makes the work of mounting and laying rather tedious and time-consuming since each clip must be separately formed by bending. However, even if clips are manufactured on a large scale, a whole line of different clips to accommodate different numbers and sizes of lines to be secured thereby must be manufactured. Quite apart from the fact that the selection of the proper clips requires an unnecessary time when doing installing and mounting work, also the keeping in stock of a large number of different clips is complicated.

Also, the work of replacing a line or the addition of further lines or cables is difficult whenever the nest or bunch of cables is tied throughout its entire length, so that the entire ties or bandage must be opened before a cable or line that has been damaged may be replaced or before a new cable can be incorporated.

Now, according to the invention, the laying of electric lines is simplified by choosing for the means to bind the lines or cables together a wire or strap (band)-shaped loop which is wrapped around the line or cable or cables, and which also consists of flexible and elastic material, either metal or insulation. This wrapper or loop is pulled taut and then screwed fast upon the support, if desired, with a clamp or is secured on and connected with the support by other ways and means.

The loop or wrapper may consist of metal or insulation and it may consist of one or of several layers. Metallic strapping or tieing material could be used also in conjunction with an insulator, the latter being either in the form of a covering or sheathing or of a distinct wrapper or loop.

Particularly appropriate has proven an arrangement in which a clamping piece which is bent off at the end near the lines is secured upon the support by the aid of two screws or bolts. Around the lines is laid a strip of insulation material, and the ends of the latter are made to overlie or overlap and are passed through under the clamp piece which serves as an abutment. The width of the strip is chosen so that it may be readily accommodated between the two screws. At the end of the clamp away from the lines or cable, the ends of the said strip are then pulled taut, and at the same time the lines or cables are straightened out. Next the clamp, while exerting steady pull at the ends of the strip or loop, is firmly screwed fast upon the support.

In order that the lines or cables may be held firmly together, after the strip has been pushed through under the clamp, the end of the strip lying upon the support may be pressed firmly against the support, while the end near the clamp may be pulled taut. As a result, the lines or cables will be pressed with particularly great firmness against the clamp piece, and the strip will come to lie tightly adjacent the clamp. If, then, the latter is made taut, the strip will be put under high tension, and the result is that the cables or lines thus tied in are unable to move or shatter even when subject to great shocks.

The strip may also be made in such a way that the part thereof laid upon the support is made slightly broader so that when the strip is pulled through the enlarged portion thereof comes to be laid against the screws of the clamp. There is no need in this connection that when pulling, the part of the strip laid on the support should be specially secured.

The ends of the strip are either cut off directly at the clamp or else are threaded through a slot in the clamp. In this latter case, it is feasible not to use a distinct new loop when securing the cables upon replacing a line or cable.

In this kind of arrangement the material for the loop or strip is wound on a spool and is cut off according to requirements. The clamp is required to be kept in stock only in a few sizes or forms seeing that one clamp will suit widely different purposes and sizes of strip, so that also the matter of keeping stock is simplified.

According to another modification of the invention, securing of the lines may be effected also in this manner that a strip of metal sheet has a row of slots or holes in its middle, or else along the margins two rows of slots or holes are arranged. It is preferable to provide slits or slots for the reason that the task of pulling tight the loop or lace laid around the line or cable is made easier. Through the holes or slots is passed a screw, a washer is placed over the slots and the screw is driven down to the clamp loop by exerting pull at the ends. The edge of the washers is curved or crimped (beaded) at the end near the loop or else is there made straight. Also, in this instance, the material for the loop or lace is wrapped on a spool and cut off according to requirements.

Instead of screw connection, any other form of union may be provided in all of the arrangements before mentioned.

Where the securing means here disclosed are used for the purpose of fastening lines or cables upon a support, say, in making cable forms on nail boards or the like, there is no need for securing the lines or cables throughout their entire length, in fact, all that is required is to tie off or strap the lines or cables at some places. This is accomplished by laying the thread used for tieing once or twice around the cables and then forming it in a tie or knot. After mounting the cable form in the rack or the like and clamping of the same, the thread ties or lacing could be removed again, if desired.

The drawings show a number of exemplified embodiments of the securing means here disclosed, in which:

Fig. 1 shows a perspective view of one embodiment of a cable clamp;

Fig. 2 shows a perspective view of another embodiment of a cable clamp;

Fig. 3 shows a perspective view of a cable clamp similar to that of Fig. 2, except that it has double binding means.

In the case of an embodiment as shown in Fig. 1, there are laid upon the support 1, for instance, two lines or cables 2 and 3, and around the latter is looped a strip or loop 4 made of insulation material such as "Presspahn" or the like. Optionally, at the end of the loop near the lines or cables, a distinct strip of insulation material such as insulation tape or the like may be laid, but the loop or lace 4 could also consist of metal. The loop, in a way as illustrated in the drawings, is pulled through under the clamp plate 5 between the screws 6 and 7. At its end 17 extending out from under the clamp piece 5, loop 4 is firmly pulled taut while end 18 at the same time is pressed upon the support, whereupon the screws 6 and 7 are screwed down. The end of the loop or lace is severed either close to the edge 8 of the clamp 5 or is slipped through slot 9 in the clamp 5.

In the embodiment shown in Fig. 2, the cables 2 and 3 are secured to support 1 by means of strap 10 having a row of slots 11. A screw 14 cooperating with a washer 20 which has its edge facing the bent portion of strap 10 bent upward is driven into support 1 to clamp the loop and thus retain cables 2 and 3 in their proper position.

In the embodiment shown in Fig. 3, the cables 2 and 3 are bound in a similar manner to that of the arrangement shown in Fig. 2, except that the strap or loop 10′ is somewhat wider and has two rows of slots 12 and 13. Screws 15 and 16 cooperate with a washer 21 which has a straight edge facing toward the loop to secure loop 10′ and cables 2 and 3 at the desired position on support 1.

What is claimed is:

1. A fastener for securing electric lines to a support comprising a strip member bent in the form of a loop around said electric lines, a clamping member in the form of a plate having a thickness greater than said strip member and a bent-up curved edge portion which bears against at least one of said lines and said strip member, and a plurality of apertures in said clamping member for providing means for securing said clamping member to said support.

2. A fastener for securing electric lines to a support comprising an insulating strip member bent in the form of a loop around said electric lines, a clamping member in the form of a plate having a curved edge portion extending beyond said lines and bearing against at least one of said lines and said strip member, and means for securing said clamping member to said support.

3. A fastener for securing electric lines to a support comprising a strip member bent in the form of a loop around said electric lines, a clamping member in the form of a plate having a bent-up portion which bears against at least one of said lines and said strip member, a slot in said bent-up portion of said clamping member for passing the free ends of said loop therethrough, and means for securing said clamping member to said support.

4. A fastener for securing electric lines to a support comprising a strip member bent in the form of a loop around said electric lines, a clamping member in the form of a plate having a bent-up portion which bears against at least one of said lines and said strip member, a long narrow slot whose width is equal to the width of said strip member for passing the ends of said loop therethrough, and means for securing said clamping member to said support.

ERICH GENTSCH.